United States Patent [19]

Braun et al.

[11] 4,385,670
[45] May 31, 1983

[54] METHOD FOR FILLING PACKAGING CONTAINERS BY WEIGHT

[75] Inventors: Kurt Braun, Hegnach; Gerhard Laupp; Rolf Leich, both of Stuttgart; Walter Saur, Ditzingen; Horst Scheifele, Stuttgart; Jürgen Schick, Ludwigsburg, all of Fed. Rep. of Germany

[73] Assignee: Robert Bosch GmbH, Stuttgart, Fed. Rep. of Germany

[21] Appl. No.: 124,046

[22] Filed: Feb. 25, 1980

[30] Foreign Application Priority Data

Dec. 21, 1979 [DE] Fed. Rep. of Germany ....... 2951665

[51] Int. Cl.³ ............................................. G01G 13/02
[52] U.S. Cl. ......................................... 177/1; 177/25; 177/52
[58] Field of Search ...................... 177/25, 52, 56, 57, 177/61, 122, 123, 50, 1; 141/83; 364/567

[56] References Cited

U.S. PATENT DOCUMENTS

| | | | |
|---|---|---|---|
| 2,198,788 | 4/1940 | Popov | 177/50 |
| 3,152,622 | 10/1964 | Rothermel | 141/83 |
| 3,648,741 | 3/1972 | Croasdale | 141/83 X |
| 3,939,928 | 2/1976 | Murarami | 177/25 |
| 3,977,483 | 8/1976 | Greanias | 177/25 X |
| 4,206,822 | 6/1980 | Mazzucchelli | 177/25 |

Primary Examiner—Joseph W. Hartary
Attorney, Agent, or Firm—Edwin E. Greigg

[57] ABSTRACT

A method for measuring out and filling of pourable goods into packaging containers and an apparatus which functions according to this method are proposed. In order to attain high filling output especially in the case of voluminous goods, or goods having a low specific weight, a feeding apparatus for the packaging containers is assigned one after another a plurality of weighing devices each having one dispensing device. The weight values of the first partial quantities measured out and filled into the packaging containers are added up in a computer (S I—S II, ΣI+II—ΣI+II+III), which directs the last dispensing device to furnish the remaining deficient quantity.

4 Claims, 1 Drawing Figure

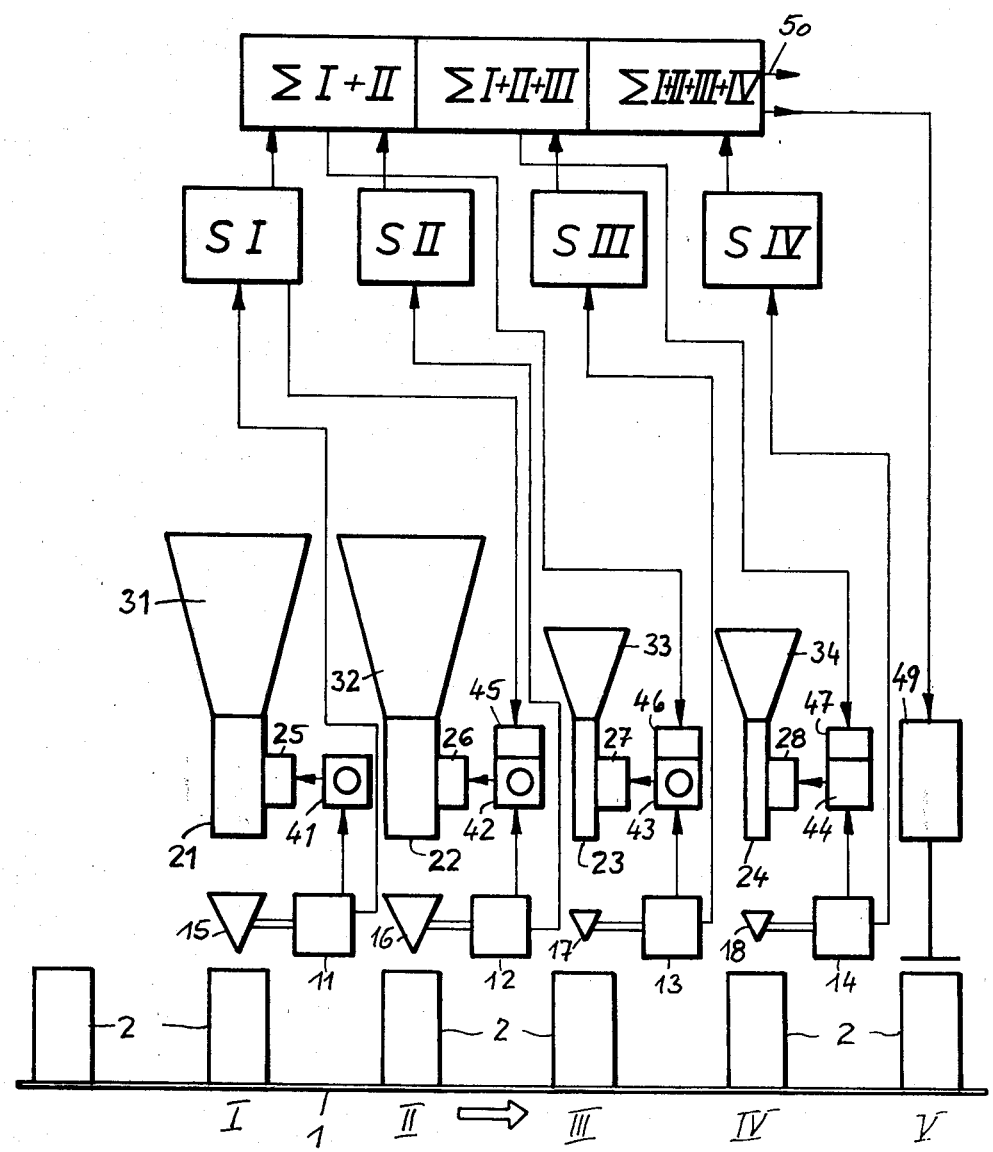

METHOD FOR FILLING PACKAGING CONTAINERS BY WEIGHT

BACKGROUND OF THE INVENTION

The invention relates to a method of weighing and filling, including measuring out a plurality of partial quantities one after another and weighed and subsequently filling each into a packaging container, adding to each certain weight values of the particular partial quantities up to a total value, in accordance with which a last partial quantity is measured out and filled into the container. In a method of this kind, known from the Swiss Pat. No. 400,595, for instance (corresponding to British Pat. No. 1,001,640), a quantity of the substance to be filled and whose weight is slightly below the target weight is first measured out volumetrically and placed in a weigher dish to determine the weight dificiency. On the basis of this deficient weight quantity, a post-dispensing apparatus is directed to add the deficient quantity to that in the weigher dish. In order to compensate for the specific weight of the filling substance, the quantity thus measured out is poured into a second weigher dish, the associated weigher device of which then indicates the still-deficient weight, which is now smaller than before, and causes a second post-dispensing apparatus to add this small quantity. The quantity of the filling substance thus measured is finally poured out into a packaging container which has been brought into place below the second weigher dish. Because the cross section of the packaging container opening is relatively small in comparison with the quantity which must be received therethrough, the filling process requires a relatively long time; thus, especially with substances which are voluminous or bulky, the attainable output per unit of time is low.

In order to increase the filling output in packaging machines, a plurality of automatic weighing units has been disposed above the feeding apparatus which delivers the packaging containers one after another; from the weighing units, the weighed-out quantities of material to be filled are poured out through funnels which travel with the containers for a predetermined distance. Such an apparatus, as disclosed, for example, in German Pat. Nos. 11 37 670 and 14 61 896 (corresponding, respectively, to U.S. Pat. No. 3,152,622 and British Pat. No. 1,015,717), is expensive. Furthermore, it has the disadvantage that, because of the great height from which the substance must fall, fragile material, such as baked goods, may be damaged or broken. It is accordingly desirable to develop a method by which quantities of materials which are susceptible to breakage from falling can be measured out by weight in a simple manner and then filled into packaging containers.

OBJECT AND SUMMARY OF THE INVENTION

The method for weighing and filling according to the invention has the advantage over the prior art in that, while a high degree of precision is maintained as to the weight of the filled quantities, high output is attained and the material to be filled is handled very protectively. Furthermore, an apparatus which functions in accordance with this method is simple in design.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows one exemplary embodiment of a weighing and filling apparatus in simplified, block diagram form.

DETAILED DESCRIPTION OF THE PREFERRED EMBODIMENT

Referring to the drawings and in accordance with a preferred embodiment of the invention, a quantity of material to be filled into a packaging container is measured out in a plurality of partial quantities, the weights of which are added up, and these partial quantities are each poured after, weighing, at various locations in the packaging container. In order to perform this method, a feeding apparatus 1 delivers the packaging containers 2, 2, 2 to be filled, which are open at the top, in steps one after another to a plurality of stations I-V located at uniform distances from one another, as shown. One weighing device 11-14, having a weigher tray or dish 15-18, is assigned to each of the stations I-IV. One dispensing device 21-24 having a drive means 25-28, such as a shaker conveyor or a conveyor belt, empties into each of the dishes 15-18. The dispensing devices 21-24 are disposed adjacent to supply containers 31-34.

The two weighing and dispensing devices 11 and 12, 21 and 22 assigned to stations I and II are equipped for the measuring out of rough filling quantities—that is, partial quantities whose weight amounts to approximately 50% or 30% of the target weight of the full quantity. In contrast, the weighing and dispensing devices 13 and 14, 23 and 24 are designed to measure out precise quantities, whose weight amounts to approximately 15% or 5% of the intended total.

In order to introduce the intended partial quantities into the weigher dishes 15-18, the drive means 25-28 of the dispensing devices 21-24 are controlled by adjustable time transducers 41-44. The time transducers 41-43 are adjustable manually to a predetermined basic value corresponding to the intended weight of the partial quantities. This basic value represents a predetermined average value, which can be automatically adjusted if there is a tendency on the part of the associated weighing device 11-14 to fall below or to exceed the intended weights. Adjusting members 45-47 are furthermore disposed on the time transducers 42-44 of the dispensing devices 22-24. The adjusting members 45-47 can add a predetermined value to the basic value for each dispensing operation, or can subtract a predetermined value therefrom, if the previously measured-out partial quantity or quantities deviate too greatly from the target weight.

The partial quantities introduced by the dispensing devices 21-24 into the weigher dishes 15-18 are weighed by the weighing devices 11-14, and the ascertained values for the weight are fed in digital form to intermediate memories S I-S IV. Weighing devices functioning in analog fashion can contain an analog-digital converter. At a predetermined instant during one filling cycle, the weight values are fed from the intermediate memories S I-S IV into summing memories. That is, the values from S I and S II are fed into summing memories $\Sigma I + II$; the values from S III are fed into $\Sigma I + II + III$; and the values from S IV are fed into $\Sigma I + II + III + IV$. Simultaneously the sum values of the summing memories are passes along further; that is, the values from ΣI+II are fed into ΣI+II+III, and so forth. Thus, just as one packaging container 2 is passed along from one station to the next, the weight value of its filling is passed on to the appropriate summing memory.

In order to be able to equalize small deviations in the weights of the partial quantities from the target weights during the course of the filling operation, which extends over four stations, the actual weight values for the partial quantities are compared in intermediate memory S I and in the summing memories ΣI+II, ΣI+II+II, ΣI+II+III+IV with the target values. At deviations falling below or exceeding the target weights by predetermined amounts, these memories furnish predetermined values to the adjusting members 45–47 of the time transducers 42–44, which are added to or substracted from the basic value there set, so that a deviation beyond permissible limits in the weight of one partial quantity is compensated for at the next subsequent station. The time transducer 44 associated with the last dispensing device 24 cannot be manually adjusted; it is triggered solely from the summing memory ΣI+II+III in such a manner that the particular deficiency in weight at that time is measured out. If it is ascertained in the summing memory ΣI+II+III+IV that the total weight of the partial quantities is beyond permissible limits, then an expeller 49 is actuated which removes the packaging container 2 to station V.

The summing memory ΣI+II+III+IV also has outputs for devices which indicate and register data relating to individual weights, total weights, and the number of times the measuring-out process is performed.

The mode of operation of the exemplary embodiment described above will now be described for the filling of baked goods whose average weight per piece is 3 grams and in quantities having a target weight of 200 grams.

A packaging container 2 is first delivered to station I, at which baked goods are fed by the measuring-out device 21, such as a uniform-feed shaker conveyor, into the weigher dish 15 over a period of time, controlled by the time transducer 41, of 0.4 seconds. The weighing device 11, after the delivery has ended, ascertains the weight of the measured-out partial quantity as, for instance, 103 grams; it causes the emptying of the partial quantity out of the weigher dish 15 into the prepared packaging container 2 and furnishes the weight value in digital form to the intermediate memory S I. There the entering weight signal is compared with the given weight value of 100 grams. Because the deviation is not greater than 3%, no signal is emitted for adjusting the basic value of the time transducer 42 for the second dispensing device 22.

While the packaging container 2 is transported to station II, the dispensing device 22 feeds baked goods, again over a period of 0.4 seconds, into the weigher dish 16. The subsequent weighing process indicates 73 grams. The weighing device 12 causes the emptying of the second partial quantity into the packaging container 2 and feeds a corresponding signal to the intermediate memory S II. The signals of the first and second partial quantities are added up in the summing memory ΣI+II, so that a weight value of 176 grams is established. A comparison with a preliminary given weight of 170 grams indicates a deviation of 6 grams, corresponding to a 3.5% deviation from the target. Because this deviation is greater than 3%, the summing memory ΣI+II sends a signal to the adjusting member 46 of the time transducer 43 to reduce the basic value of 0.4 seconds by 0.1 seconds, resulting in a operative duration of 0.3 seconds.

While the packaging container 2 is transported from station II to station III, a third partial quantity is fed, over the newly established duration of 0.3 seconds, by the dispensing device 23 into the weigher dish 17. The subsequent weighing process indicates 15 grams. The transfer of this weight value via the intermediate memory S III into the summing memory ΣI+II+III, and of the weight value from the two previous partial quantities as well, which has been passed along from the summing memory ΣI+II, and adding up these two signals results in a weight value of 191 grams. This value is compared in the summing memory ΣI+II+III with the nominal weight value of 200 grams and a weight deficiency of 9 grams is ascertained. A corresponding signal is sent to the adjusting member 47 of time transducer 43 for the fourth dispensing device 24. This dispensing device 24 is dimensioned such that it feeds ten pieces of baked goods, having an average weight per piece of 3 grams, over the duration of 1 second. Because in the present case there is a deficiency of 9 grams compared to the nominal weight, the adjusting member 47, according to the signal entering from the summing memory ΣI+II+III, sets the time transducer 44 to a switched-on time of 0.3 seconds, so that the dispensing device feeds three pieces of baked goods into the weigher dish 18. Meanwhile, the weigher dish 17 has emptied the third partial quantity into the packaging container 2, which has now been transported to Station IV. There, after the weighing of the fourth partial quantity by the weighing device 14, the fourth partial quantity, having a weight of 9 grams, is fed into the packaging container 2. Thus the total quantity placed in the packaging container 2, made up of the four partial quantities, has a weight of 200 grams. The packaging container 2 is now delivered by the feeding apparatus 1 to further stations where it is sealed.

The dispensing device 24 for adding a quantity corresponding to the weight deficiency, and which functions with a preliminay given time value, can be used, with appropriate adaptation, for pourable goods in general. For piecewise goods, such as items of baked goods, whose individual weight is substantially constant, an apparatus can also be used which, depending on the given value of the summing memory ΣI+II+III, feeds a corresponding number of pieces into the packaging container 2.

It is noted in addition that the number of dispensing devices is not limited to four. When the goods are well capable of withstanding pouring, three dispensing devices are also sufficient. In contrast, in the case of voluminous goods or goods having a low specific weight, the number of dispensing devices can be increased further. For instance, with five dispensing devices, weights of approximately 35%, 30%, 20%, 10% and 5% can be established as preliminary given weights at the sequential stations for the five partial quantities to be measured out. It is further noted that dispensing devices suitable in general for the goods to be packaged can be used if they feed a uniform flow of goods over a predetermined duration; examples are shaker conveyors, worm-type dispensing apparatuses, belt conveyors and pumps. Apparatuses which function volumetrically can also be used if their measuring vessels are adjustable.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A method for filling packaging containers with a quantity of pourable goods, measured out by weight, comprising the steps of:

sequentially measuring out of a plurality of first partial quantities belonging to one package unit one after another;

weighing, one after another, of the measured out first partial quantities belonging to one package unit;

storing and summing up the weight values of the first partial quantities belonging to one package unit in a computer;

sequentially filling of the first partial quantities belonging to one package unit into a container after being weighed;

comparing the summed-up weight values of the weighed partial quantities belonging to one package unit with a set-point value; and measuring out at least one other partial quantity equal to the ascertained missing weight value and the filling thereof into the container.

2. A method as defined by claim 1, wherein the filled total quantity is made up of at least three partial quantities measured out and filled one after another, with the weight of each becoming smaller each time.

3. A method as defined by claim 1 or 2, wherein in the weight values of the partial quantities are fed the form of digital signals into a multistage computer, which after summing the signals controls the measuring out of the last partial quantity.

4. A method as defined by claim 1, wherein one signal at a particular time pertaining to a predetermined total quantity is added to a signal already present in a summing memory and then is passed along to a next subsequent summing memory of the computer.

* * * * *